US012705035B2

(12) United States Patent
Hvitved et al.

(10) Patent No.: US 12,705,035 B2
(45) Date of Patent: Aug. 11, 2026

(54) PROGRAM DEPENDENT COMPONENT AMALGAMATION

(71) Applicant: Microsoft Technology Licensing, LLC, Redmond, WA (US)

(72) Inventors: Tom Hvitved, Copenhagen (DK); Christopher Stephen Frederick Smowton, Oxford (GB); Tamás Vajk, Visp (CH); Arthur Iwan Baars, Valencia (ES); Michael Nebel, Vanløse (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 18/642,997

(22) Filed: Apr. 23, 2024

(65) Prior Publication Data

US 2025/0328323 A1 Oct. 23, 2025

(51) Int. Cl.
*G06F 8/41* (2018.01)
*G06F 8/71* (2018.01)
*G06F 8/75* (2018.01)

(52) U.S. Cl.
CPC .................................... *G06F 8/433* (2013.01)

(58) Field of Classification Search
CPC ............... G06F 8/433; G06F 8/71; G06F 8/75
See application file for complete search history.

(56) References Cited

U.S. PATENT DOCUMENTS

| | | | | |
|---|---|---|---|---|
| 5,805,899 | A * | 9/1998 | Evans | G06F 8/71 717/170 |
| 8,856,726 | B2 | 10/2014 | Conrad | |
| 9,183,120 | B1 * | 11/2015 | Webb | G06F 8/76 |
| 9,531,745 | B1 | 12/2016 | Sharma | |
| 11,044,139 | B1 * | 6/2021 | Farber | G06F 16/9024 |
| 11,354,108 | B2 * | 6/2022 | Sridhara | G06F 16/24578 |
| 12,099,835 | B1 * | 9/2024 | Gunnin | G06F 8/436 |

(Continued)

FOREIGN PATENT DOCUMENTS

| | | | |
|---|---|---|---|
| CN | 116679930 | A | 9/2023 |
| WO | 2019227899 | A1 | 12/2019 |

OTHER PUBLICATIONS

"CodeQL and the Static Tools Logo Test", retrieved from << https://learn.microsoft.com/en-us/windows-hardware/drivers/devtest/static-tools-and-codeql >>, Jan. 18, 2023, 16 pages.

(Continued)

*Primary Examiner* — Darren B Schwartz
(74) *Attorney, Agent, or Firm* — Wade IP Law PLLC

(57) ABSTRACT

Some embodiments construct a set of build dependencies for a program without access to a full set of build instructions. When multiple clashing name resolutions are identified for a particular dependency, a union of the alternative versions is formed. Intermediate representations of the union of program versions, such as symbol tables, abstract syntax trees, and other internal compiler data structures, are emitted to persistent non-volatile storage, instead of using a single resolution to create temporary intermediate data to build an executable program. Security analysis and licensing analysis utilize the persisted program representations to analyze the union of multiple overlapping but different versions of the program.

20 Claims, 3 Drawing Sheets

(56) References Cited

U.S. PATENT DOCUMENTS

| | | | | |
|---|---|---|---|---|
| 2004/0221275 | A1* | 11/2004 | Handal | G06F 8/71<br>717/136 |
| 2005/0248573 | A1 | 11/2005 | Grassia | |
| 2008/0127040 | A1 | 5/2008 | Barcellona | |
| 2010/0162219 | A1* | 6/2010 | Bowler | G06F 8/434<br>717/154 |
| 2010/0251212 | A1* | 9/2010 | Grunkemeyer | G06F 8/71<br>717/122 |
| 2012/0290681 | A1* | 11/2012 | Jones | H04L 67/34<br>709/217 |
| 2013/0326479 | A1* | 12/2013 | Russell | G06F 8/70<br>717/121 |
| 2015/0169321 | A1* | 6/2015 | Rissell | G06F 8/70<br>717/121 |
| 2015/0379064 | A1 | 12/2015 | Xin et al. | |
| 2016/0019037 | A1* | 1/2016 | Varga | G06F 8/443<br>717/151 |
| 2016/0328230 | A1* | 11/2016 | Schneider | G06F 8/54 |
| 2017/0357485 | A1 | 12/2017 | Rees | |
| 2018/0060065 | A1* | 3/2018 | Lai | G06F 8/71 |
| 2019/0325352 | A1* | 10/2019 | Tsai | G06F 16/282 |
| 2021/0042099 | A1 | 2/2021 | Bhandari | |
| 2021/0382708 | A1* | 12/2021 | Sagal | G06F 8/71 |
| 2024/0078101 | A1* | 3/2024 | Hykes | G06F 8/60 |
| 2024/0419423 | A1 | 12/2024 | Chen | |
| 2025/0315219 | A1 | 10/2025 | Smowton | |

OTHER PUBLICATIONS

"What is CodeQL?", retrieved from << https://learn.microsoft.com/en-us/training/modules/code-scanning-with-github-codeql/2-what-is-codeql >>, no later than Mar. 5, 2024, 4 pages.

"CodeQL", retrieved from << https://codeql.github.com/ >>, no later than Mar. 5, 2024, 5 pages.

"Migrating Builds From Apache Maven", retrieved from << https://docs.gradle.org/current/userguide/migrating_from_maven.html >>, no later than Mar. 5, 2024, 17 pages.

"Central Index", retrieved from << https://maven.apache.org/repository/central-index.html >>, no later than Mar. 5, 2024, 1 page.

"Apache Maven", retrieved from << https://en.wikipedia.org/wiki/Apache_Maven >>, Feb. 14, 2024, 7 pages.

"depgraph-maven-plugin", retrieved from << https://github.com/ferstl/depgraph-maven-plugin >>, no later than Mar. 5, 2024, 11 pages.

"GitHub Dependency Graph Gradle Plugin", retrieved from << https://github.com/gradle/github-dependency-graph-gradle-plugin >>, no later than Mar. 5, 2024, 5 pages.

"CodeQL overview", retrieved from << https://codeql.github.com/docs/codeql-overview/ >>, no later than Mar. 6, 2024, 2 pages.

Martin Schröder, "ChatGPT Understands Assembly", retrieved from << https://swedishembedded.com/gpt-translate-assembly/ >>, May 4, 2023, 19 pages.

"Map dependencies with code maps", retrieved from << https://learn.microsoft.com/en-us/visualstudio/modeling/map-dependencies-across-your-solutions?view=vs-2022 >>, Mar. 9, 2023, 21 pages.

"How to Write Go Code", retrieved from << https://go.dev/doc/code >>, no later than Mar. 24, 2024, 7 pages.

"Is there a good tool for Makefile generation? [closed]", retrieved from << https://stackoverflow.com/questions/9589/is-there-a-good-tool-for-makefile-generation >>, Aug. 13, 2008, 5 pages.

Linxin Song, Jieyu Zhang, "Agent AutoBuild—Automatically Building Multi-agent Systems", retrieved from << https://microsoft.github.io/autogen/blog/2023/11/26/Agent-AutoBuild/ >>, Nov. 26, 2023, 8 pages.

"Apache Ivy", retrieved from << https://en.wikipedia.org/wiki/Apache_Ivy >>, Jan. 26, 2024, 2 pages.

"Transitive dependency", retrieved from << https://en.wikipedia.org/wiki/Transitive_dependency >>, Feb. 28, 2024, 2 pages.

"Software build", retrieved from << https://en.wikipedia.org/wiki/Software_build >>, Feb. 2, 2024, 2 pages.

"Software versioning", retrieved from << https://en.wikipedia.org/wiki/Software_versioning >>, Jan. 22, 2024, 17 pages.

"Overview of linking for split or collapsed entities", retrieved from << https://www.ibm.com/docs/en/imdm/12.0?topic=support-overview-linking-split-collapsed-entities >>, Apr. 12, 2021, 1 page.

"Can you use the same repository for multiple projects?", retrieved from << https://www.quora.com/Can-you-use-the-same-repository-for-multiple-projects >>, Feb. 28, 2024, 6 pages.

"CodeQL", GitHub, Retrieved From: https://github.com/github/codeql, no later than Apr. 29, 2024, 4 Pages.

"v2.15.0", GitHub, Retrieved From: https://github.com/github/codeql-cli-binaries/releases/tag/v2.15.0, Oct. 11, 2023, 2 Pages.

Bendowski, et al., "Android light classes", GitHub, Retrieved From: https://github.com/JetBrains/android/blob/master/android/docs/android-light-classes.md, accessed on Apr. 3, 2024, 4 Pages.

Cébron, et al., "AndroidSQL language support", GitHub, Retrieved From: https://github.com/JetBrains/android/blob/master/android-lang/src/com/android/tools/idea/lang/androidSql/README.md, accessed on Apr. 3, 2024, 5 Pages.

Helvert, et al., "Android Studio", GitHub, Retrieved From: https://github.com/JetBrains/android, accessed on Apr. 3, 2024, 7 Pages.

Koval, et al., "Custom language support". GitHub, Retrieved From: https://github.com/JetBrains/android/blob/master/android-lang/src/com/android/tools/idea/lang/README.md, accessed on Apr. 3, 2024, 6 Pages.

Xu, et al., "Generate lexer and parser code", Git Hub, Retrieved From: https://github.com/JetBrains/android/blob/master/android-lang-databinding/README.md, accessed on Apr. 3, 2024, 2 Pages.

Song, et al., "Agent AutoBuild—Automatically Building Multi-Agent Systems", AutoGen, Nov. 26, 2023, pp. 1-8.

Non-Final Office Action mailed on Apr. 14, 2026, in U.S. Appl. No. 18/628,867, 26 pages.

* cited by examiner

ENHANCED SYSTEM 102, 202 WITH BUILD DEPENDENCY AMALGAMATION (BDA) FUNCTIONALITY 204

MEMORY/MEDIA 112, 114

BDA SOFTWARE 302 WHICH UPON EXECUTION EXTRACTS 304 DEPENDENCY INFO 306, CONSTRUCTS 308 DEPENDENCY SET 310, AMALGAMATES 206, GENERATES 212 AND EMITS 312 PROGRAM REPRESENTATION 210

NAME 338 RESOLUTION 314

ITEM 330

RESULT 318

CODE STUB 320

COMPONENT 322 ID 324

BUILD SYSTEM 326 FILE 328

INDEX 316

PROCESSOR 110

VERSION 332: SPACE 334, NUMBER 340

INTERFACE 336

PROGRAM DEPENDENT COMPONENT AMALGAMATION

BACKGROUND

The process of creating an executable software program by combining multiple components is referred to as "building" the program. In addition to using the components themselves, the build process uses build instructions. Build instructions are sometimes complex. Some build instructions specify information such as where to obtain (copies of) the program's components, which version of a particular component to use when more than one version exists, which build tools to invoke (e.g., repository access commands, compilers, linkers), which order to invoke the build tools in, which command line arguments or other parameters to pass into the build tools when they are invoked, and where to store the results of the build process.

Some build process results are used only during the build, such as temporary files created by a compiler for use by the compiler during compilation of a source code component into executable form. Other build results continue to exist after the build process is complete, such as executable code which was previously generated by another compilation, or executable code which is generated during the current compilation from source code components for use as part of an executable version of the program that is currently being built.

However, the complexity of the build process, and limitations on the availability of build instructions in some scenarios, lead to opportunities for technical advances in software development.

SUMMARY

Some embodiments address technical challenges arising from efforts to determine a program's build dependencies when build instructions for the program are incomplete, unavailable, or inconsistent. One challenge is how to find dependency-related information when a makefile, taskfile, build commands file, or other file containing build instructions is not available. Another challenge is how to support an analysis of a program for security vulnerabilities or licensing requirements when the identities of some of the program's components are unclear due to a lack of build instructions to build the program. Another challenge is how to respond to conflicts between name resolutions of a given build dependency. Other technical challenges are also addressed herein.

Some embodiments taught herein provide or utilize build dependency amalgamation. In some cases, this includes ascertaining that each of at least two name resolutions identifies a different respective item to satisfy a build dependency of a program, forming a union which specifies the at least two name resolutions, supplying the union to a tool which is configured to conduct an analysis of the program, and receiving a result of the analysis, the result computed from at least the union. Some scenarios involve additional activities, such as executing a dependency extraction tool to extract dependency information from a file of a program, constructing a dependency set from the dependency information, utilizing the dependency set to generate program representations, and emitting at least a portion of the program representations. In some cases, some or all of the various activities are performed without fully building the program. The program representations support security analysis, licensing analysis, and other analyses of the program even when the program was not built.

Other technical activities, technical characteristics, and technical benefits pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
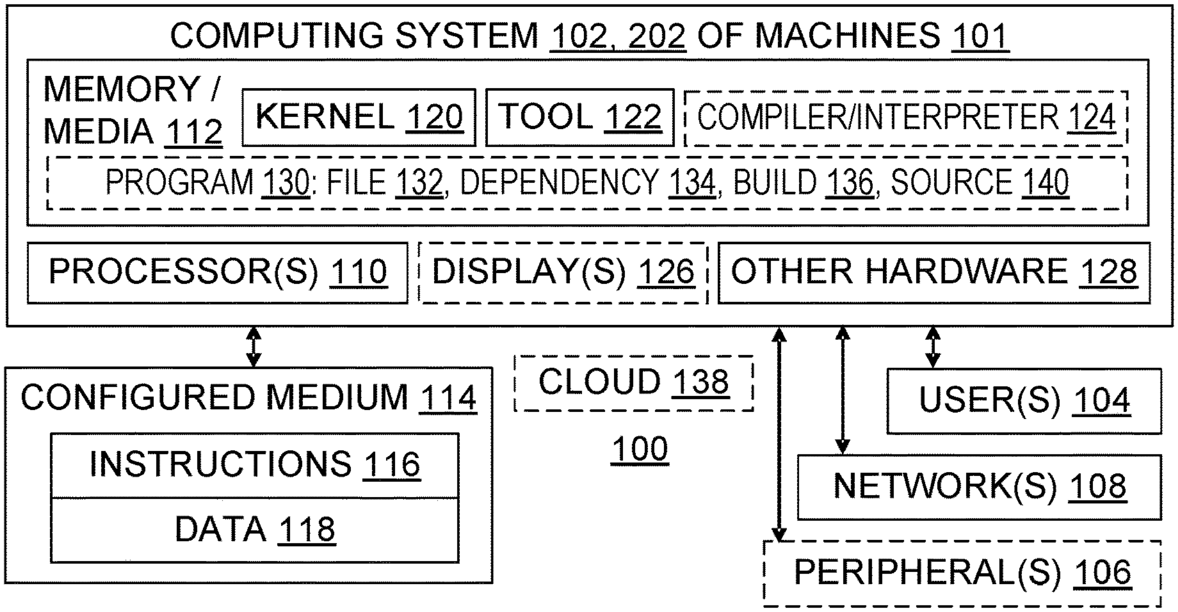
FIG. 1 is a diagram illustrating aspects of computer systems and also illustrating configured storage media, including some aspects generally suitable for embodiments which include or use build dependency amalgamation (BDA) functionality.

Some teachings described herein were motivated by technical challenges faced and insights gained during efforts to improve technology for security analysis tools. These challenges and insights provided some motivations, but the teachings herein are not limited in their scope or applicability to these particular tools, motivational challenges, solutions, or insights.

Some security tools will search code for anti-patterns, search code for the use of components which have known vulnerabilities, or perform other kinds of security analyses during a program build or otherwise in conjunction with a program build. In some scenarios, some compilation results which have typically been temporary (kept in volatile memory) and typically were only used by the compiler itself during a regular build, are persisted instead to non-volatile storage, and are then used during or after the build by a security analysis tool, such as a GitHub CodeQL™ semantic code analysis tool (mark of GitHub, Inc.). For example, abstract syntax trees, symbol tables, data type definitions, call targets, and other representations of compiler-generated semantic data are sometimes persisted, and are then used (possibly after transformation, e.g., to a database format) to support semantic code analysis as part of a security analysis.

However, in these scenarios, the persisted compiler output is a by-product of the build process. In particular, the build process that produces the persisted representations is guided by a full set of build instructions. Under this approach, without the build instructions there is no build process, and without the build process there are no persisted representations, and without the persisted representations the security analysis is severely limited or is not done at all.

This approach of piggy-backing the production of security-facilitating persisted semantic representations on a build process limits the availability, scalability, and efficiency of any security analyses which take the persisted semantic representations as helpful inputs or in some cases even as required inputs. Lack of complete build instructions is debilitating to cybersecurity efforts. Security personnel will generally not have access to all the particular build instructions that match a program these personnel are trying to analyze, or even know which build instructions and context are missing without trying to run a build to generate the desired persisted representations. Even when a file of build instructions is stored alongside a program's source code, the build instructions are sometimes effectively incomplete, in that they implicitly depend on their operating environment to provide particular helper programs, configuration files, or environment variables that the build instructions will use and refer to; this reliance sometimes renders the build instructions unusable in the absence of a suitable environment. Security tooling which is meant to analyze many programs automatically will likewise often lack the specific location of the programs' respective build instruction files, even if the tooling has access to some of the programs' components in a repository, such as source code files.

Moreover, relying on the build process to produce the persisted representations for use in security analyses is inefficient. Emitting executable code and building an executable version of a program is an unnecessary use of computational resources if the desired persisted representations could be obtained without generating executable code.

Some embodiments described herein utilize or provide a build dependency amalgamation method performed in a computing system, which includes automatically: ascertaining that each of at least two name resolutions identifies a different respective item to satisfy a build dependency of a program; forming a union which specifies the at least two name resolutions; supplying the union to a tool which is configured to conduct an analysis of the program; and receiving a result of the analysis, the result computed from at least the union.

This BDA functionality has the technical benefit of enabling security analyses, licensing analyses, and other program analyses which are computed from program intermediate representations such as parsing results, symbol tables, abstract syntax trees, and the like, even when a definitive unique program build is not possible due to name resolution ambiguity. Moreover, the analyses are enabled without requiring multiple builds, such as requiring one build of the program for each of the identified name resolutions of a given build dependency of the program. Avoiding builds conserves computational resources.

In some embodiments, the method includes getting at least one of the name resolutions from a trace of an attempt to build the program. This BDA functionality has the technical benefit of leveraging available build attempt results to support program analysis without also expending computational resources on a separate and additional production of intermediate representations. Instead of computing the program representations twice (one time for the build, and another time to support security or other analyses), the program representations computed for the build are re-used for the one or more analyses.

In some embodiments, the method includes getting at least one of the name resolutions without completing a build of the program. This BDA functionality has the technical benefit of leveraging available build instructions to support program analysis without also expending computational resources on generation and emission of an entire executable code of the program. Even when partial build instructions are present and leveraged, some embodiments improve the efficiency of program representation production by still avoiding the generation and emission of at least part of the program's executable code.

In some embodiments, the method includes obtaining a source code stub which represents the build dependency, and submitting the source code stub to the tool. This BDA functionality has the technical benefit of accounting for cases where the same fully-qualified name is defined both in a dependency and in source code, which improves the consistency and scope of the one or more analyses.

In some embodiments, the method includes assigning at least one name resolution a rank which is computed at least from the extent to which the item provides at least one of: a definition of a symbol which is not defined in a portion of a source code of the program; a symbol data type which is consistent with a use of the symbol in a portion of a source code of the program; or a routine signature which is consistent with a use of the routine in a portion of a source code of the program.

This BDA functionality has the technical benefit of prioritizing name resolutions according to objective criteria that are relevant to the one or more analyses. The prioritization helps conserve developer time and computational resources by focusing attention, effort, and resource expenditures on the name resolutions which are more likely to be actually used (or more likely to have been actually used) in a full build of the program. The full build is the version of the program for which the results of the one or more analyses are the most impactful.

Some embodiments described herein utilize or provide a BDA dependency set construction method in a computing system. The method includes automatically: extracting dependency information from a file of a program, constructing a dependency set from at least the dependency information, the dependency set identifying a set of candidate build dependencies of the program, generating a program representation, e.g., an intermediate representation from an adapted compiler, which is consistent with at least one candidate build dependency of the dependency set, and emitting at least a portion of the program representation. In some embodiments, the extracting, constructing, generating, and emitting are performed without building an executable version of the program.

This BDA functionality has the technical benefits of increasing the availability, scalability, and efficiency of security and licensing analyses which take the persisted representations as inputs. This is accomplished by separating the generation of the persisted representations from the generation and emission of executable code. With these embodiments, persisted representations and dependencies are obtained for use in a security analysis or a licensing analysis even when build instructions have not been located, are not available, or do not presently exist, and even when a build is incomplete or not performed at all.

In some embodiments, the persisted program representations include an expression type representation which represents an expression type of an expression of the program, or include a call target representation which represents a call target of the program, or both. This BDA dependency set construction functionality has the technical benefit of producing program semantic representations which are particularly useful for security analysis, and even more particularly useful for a semantic code analysis which checks for negligent or malicious uses of control structures and data types in a program. In particular, program semantic representations are useful for a security analysis which checks whether the program is, through negligence or malice, susceptible to an exploit. Exploits include, e.g., exfiltrating sensitive information, giving untrusted users unexpected control over the program or its environment, or allowing untrusted users to crash or otherwise render the program's services unusable to others.

In some embodiments, the BDA dependency set construction method adheres to a version selection priority order while constructing the dependency set. For example, in some embodiments the version selection priority order specifies a version recited in a repository as a high priority choice, specifies an installed version as a medium priority choice, and specifies a latest version as a low priority choice. This BDA dependency set construction functionality has the technical benefit of resolving ambiguities or conflicts or gaps in dependency information with respect to a program component's version, thereby facilitating synthesizing or correcting or completing build instructions.

In some embodiments, the BDA dependency set construction method gathers a list of program component identifications from at least one of: a restored package, a name-value parameter persisted data file, a restored file containing a list of files included in a project, a list of restored packages, or a project dependency graph file, and the method includes the list of program component identifications in the dependency set. This BDA dependency set construction functionality has the technical benefit of resolving ambiguities or conflicts or gaps in program component identifications, thereby facilitating synthesizing or correcting or completing build instructions.

In some embodiments, constructing the dependency set includes querying dependency information from a build system file. This BDA dependency set construction functionality has the technical benefit of leveraging available build instructions to support program analysis without also expending computational resources on generation and emission of executable code. Even when partial build instructions are present and leveraged, some embodiments improve the efficiency of program representation production by still avoiding the generation and emission of executable code.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 138. An individual machine is a computer system, and a network or other non-empty group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

The distinction between human-driven accounts and machine-driven accounts is a different distinction than the distinction between attacker-driven accounts and non-attacker driven accounts. A particular human-driven account may be attacker-driven, or non-attacker-driven, at a given point in time. Similarly, a particular machine-driven account may be attacker-driven, or non-attacker-driven, at a given point in time.

Although for convenience, examples and claims herein sometimes speak in terms of accounts, "account" means "account or session or both" unless stated otherwise. In this disclosure, including in the claims and elsewhere, a statement about activity by "the user account or the user session" does not mean that both the user account and the user session must be present. Instead, such a statement is to be understood as a pair of corresponding but distinct statements given as alternatives, one statement being about activity by the user account, and the other statement being about activity by the user session. Likewise, a characterization of "the user account or the user session" does not mean that both the user account and the user session must be present. Instead, such a characterization is to be understood as a pair of corresponding but distinct characterizations given as alternatives, one characterizing the user account, and the other characterizing the user session.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 138 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or non-empty set 452 of accounts, user or non-empty group of users, IP address or non-empty group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components, Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, BDA functionality 204 could be installed on an air gapped network 108 and then be updated periodically or on occasion using removable media 114, or not be updated at all. Some embodiments also communicate technical data or technical instructions or both through direct memory access, removable or non-removable volatile or nonvolatile storage media, or other information storage-retrieval and/or transmission approaches.

In this disclosure, "semantic" refers to program or program construct meaning, as exemplified, represented, or implemented in program aspects such as data types, data flow, resource usage during execution, and other operational characteristics. In contrast, "syntactic" refers to whether a string of characters is valid according to a programming language definition or program input specification.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, devices, data structures, kinds of data, settings, parameters, components, computational resources, programming languages, tools, workflows, or algorithm implementations, or other items in a computing environment, which are disclosed herein but not associated with a particular reference numeral herein. Corresponding drawings may also be added.

More About Systems

Figure 2:
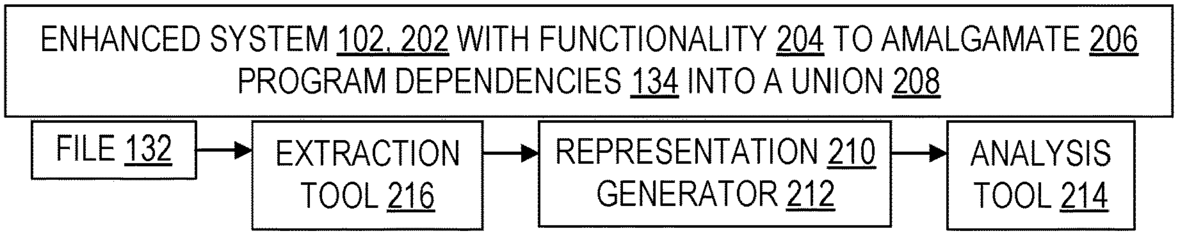
FIG. 2 is a block diagram illustrating aspects of a family of enhanced systems which are each configured with BDA functionality.

FIG. 2 illustrates a computing system 102 configured by one or more of the build dependency amalgamation (BDA) functionality enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein.

Figure 3:
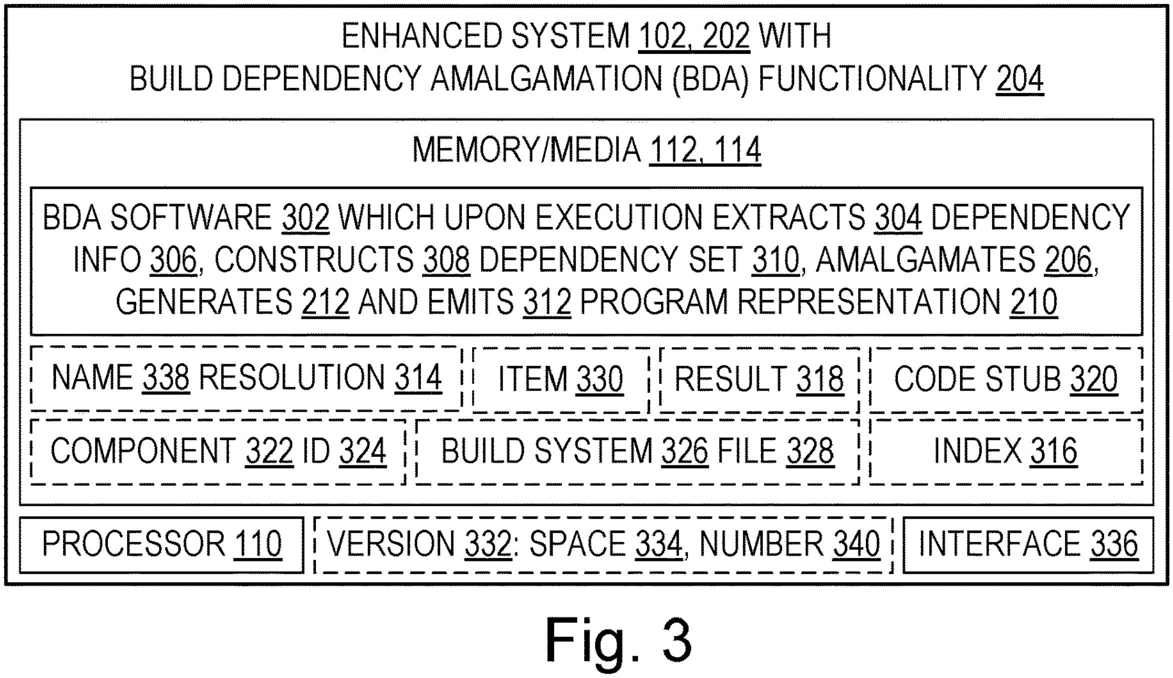
FIG. 3 is a block diagram illustrating aspects of another family of systems which are each enhanced with BDA functionality, including some systems with software which upon execution performs a first family of BDA methods.

FIG. 3 shows some aspects of some enhanced systems 202. Like FIG. 2, FIG. 3 is not a comprehensive summary of all aspects of enhanced systems 202 or all aspects of BDA functionality 204. Nor is either figure a comprehensive summary of all aspects of an environment 100 or system 202 or other context of an enhanced system 202, or a comprehensive summary of any aspect of functionality 204 for potential use in or with a system 102. FIG. 3 items are discussed at various points herein.

Figure 4:
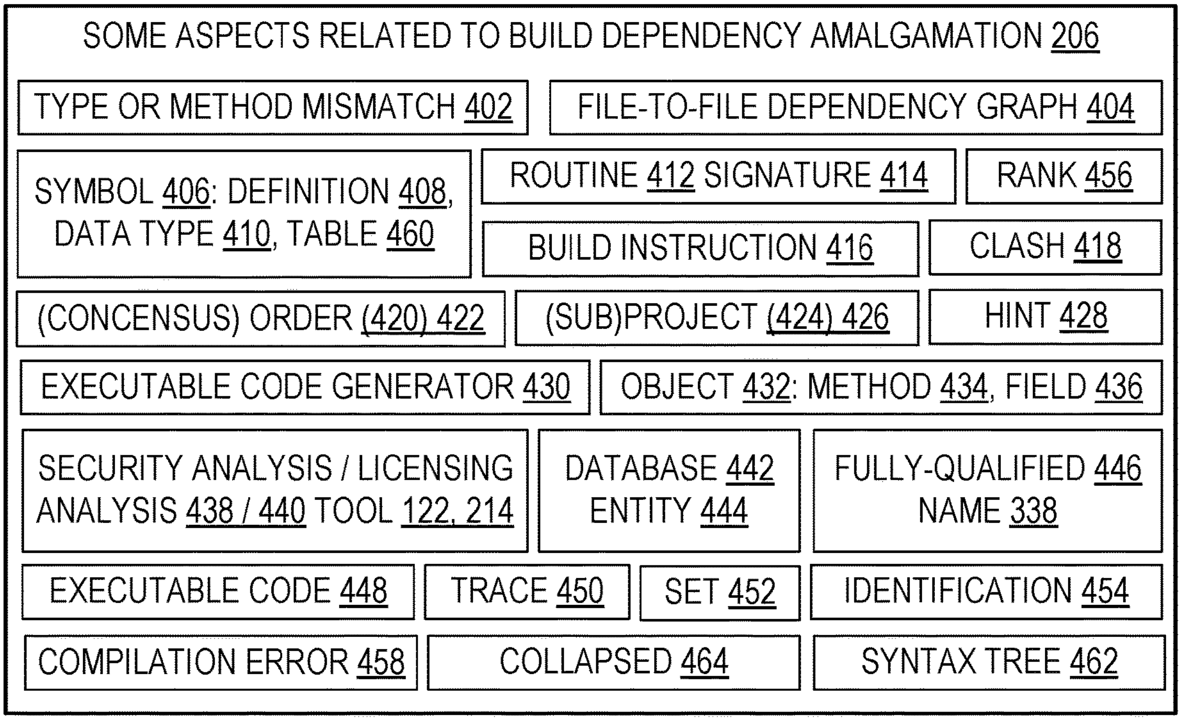
FIG. 4 is a block diagram illustrating some additional aspects related to build dependency amalgamation.

FIG. 4 shows some additional aspects related to build dependency amalgamation 206. This is not a comprehensive summary of all aspects of build dependency amalgamation. FIG. 4 items are discussed at various points herein.

Figure 5:
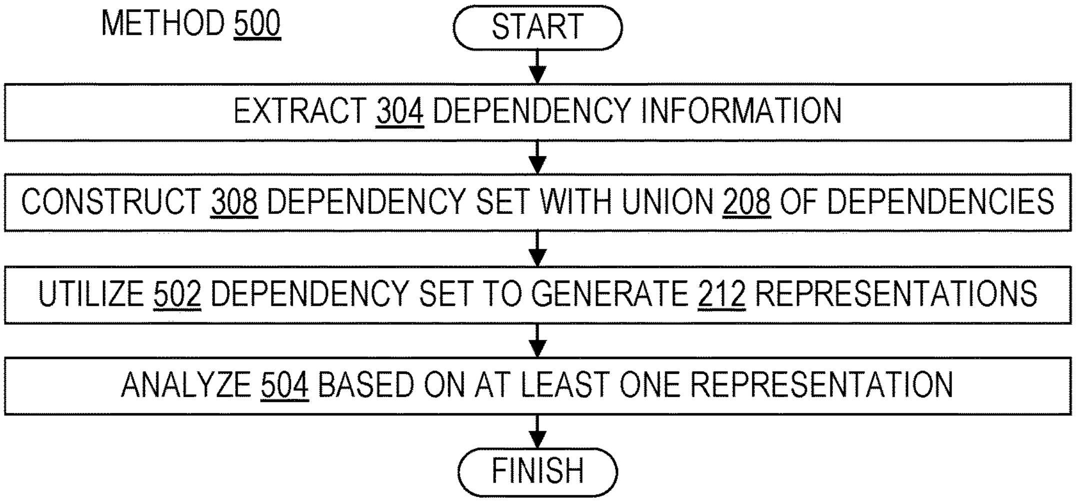
FIG. 5 is a flowchart illustrating a second family of BDA methods.
Figure 6:
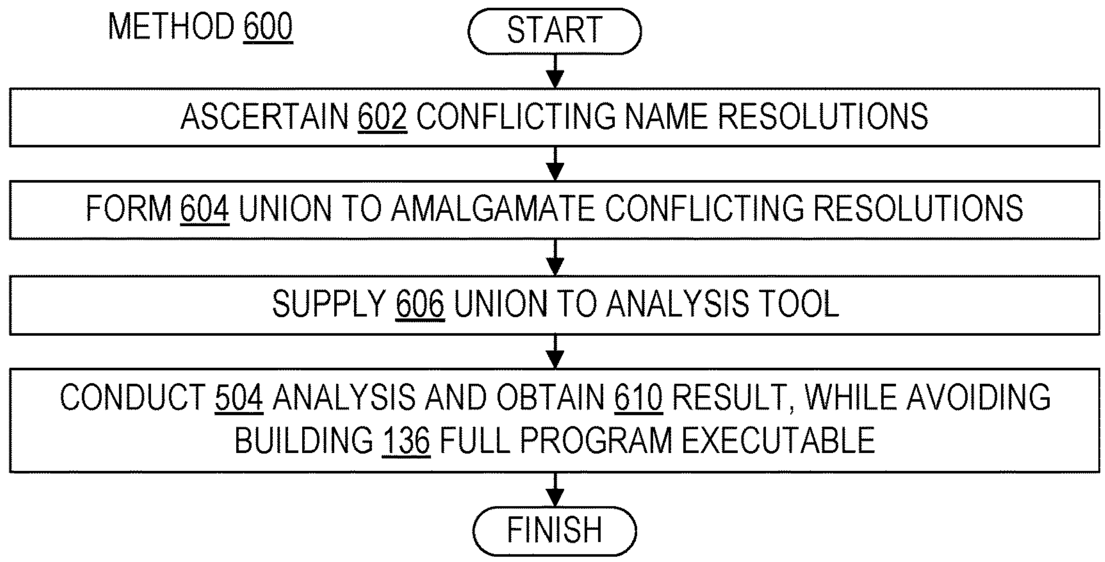
FIG. 6 is a flowchart illustrating a third family of BDA methods.
Figure 7:
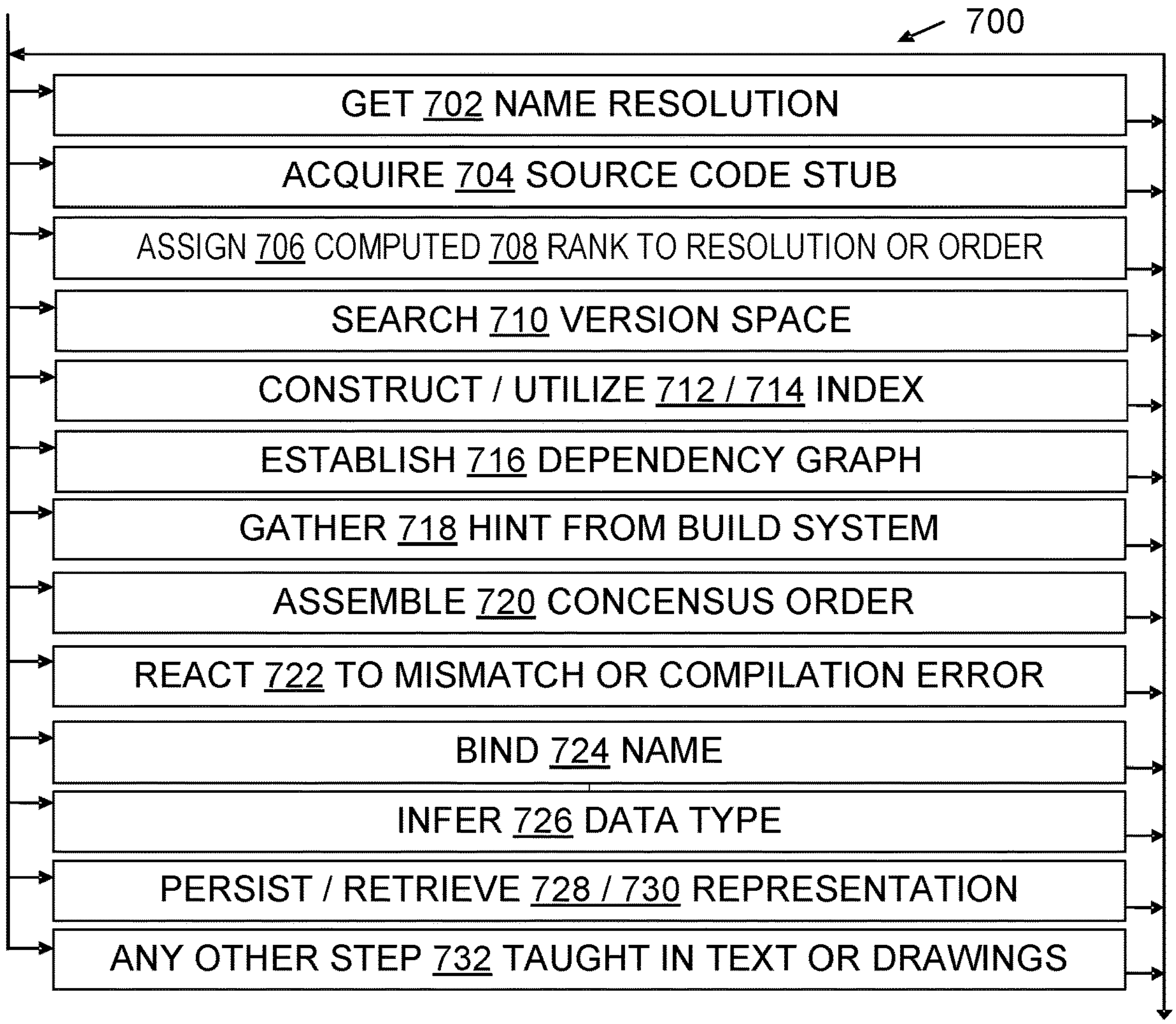
FIG. 7 is a flowchart further illustrating BDA methods, and incorporating as options the steps of FIGS. 2, 3, 5, and 6.

The other figures are also relevant to systems 202. FIGS. 5 to 7 are flowcharts which illustrate some methods of BDA functionality 204 operation in some systems 202.

In some embodiments, the enhanced system 202 is networked through an interface 336. In some, an interface 336 includes hardware such as network interface cards, software such as network stacks, APIs, or sockets, combination items such as network connections, or a combination thereof.

Some embodiments include a computing system 202 which is configured to utilize or provide BDA functionality 204. The system 202 includes a digital memory set 112 including at least one digital memory 112, and a processor set 110 including at least one processor 110. The processor set is in operable communication with the digital memory set. A digital memory set is a set which includes at least one digital memory 112, also referred to as a memory 112. The word "digital" is used to emphasize that the memory 112 is part of a computing system 102, not a human person's memory. The word "set" is used to emphasize that the memory 112 is not necessarily in a single contiguous block or of a single kind, e.g., a memory 112 may include hard drive memory as well as volatile RAM, and may include memories that are physically located on different machines 101. Similarly, the phrase "processor set" is used to emphasize that a processor 110 is not necessarily confined to a single chip or a single machine 101. Sets are non-empty unless described otherwise.

In one example, at least one processor in operable communication with the at least one digital memory is configured to perform a BDA method 700. This method 700 includes (a) ascertaining 602 that each of at least two name resolutions 314 in a non-empty set 452 of name resolutions identifies a different respective item 330 to satisfy a build dependency 134 of a program 130, (b) forming 604 a union 208 which specifies the at least two name resolutions, (c) supplying 606 the union to a tool 214, 122 which is configured to conduct an analysis 504 of the program, and (d) obtaining 610 a result 318 of the analysis, the result 318 computed 504 from at least the union 208.

For purposes herein, an item "satisfies" a build dependency when the item's name 338 is consistent with any constraint on item names set forth by the build dependency, and the item's URL, path name, or other location identification 454 is consistent with any constraint on item location set forth by the build dependency. Constraints may include wildcards, defined sets of satisfactory items, or partial identifications, for example.

In some embodiments, the set of name resolutions 314 includes at respective identifications 324, 454 of two different versions 332 of a program component 322 that each satisfy the build dependency 134. One of the many possible examples of two different versions of the build dependency is: "from oldlib import foobar" versus "from newlib import foobar".

In some embodiments, the set of name resolutions 314 includes respective identifications 324, 454 of two different versions 332 of a source code 140 which is specified in the build dependency 134. One of the many possible examples of two different versions of a source code specified in the build dependency is: "include headerv1.h" versus "include headerv2.h".

In some embodiments, the set of name resolutions 314 includes identifications 454 of two different fully-qualified 446 names 338 which identify 454 respective alternatives 330 for a program component 322 of the program. One of the many possible examples of two different fully-qualified names which identify alternatives for a program component of the program includes a class such as "System.Object" which is defined in two different versions of a standard library, for example.NET Framework 4.8.1 (https colon// dotnet.microsoft dot com/en-us/download/dotnet-framework/net481) versus.NET 8 (https colon//dotnet.microsoft dot com/en-us/download/dotnet/8.0). Another example is: "git pull https colon//github dot com/serious/p1.git" versus "git pull https colon//github dot com/serious/p2.git". The URLs provided herein have disabled hyperlinks per Patent Office policy.

In some embodiments, the set of name resolutions 314 includes identifications 324, 454 of two items 330 which reside in different respective sub-projects 424.

In some embodiments, the set of name resolutions 314 includes a first definition 408 of a fully-qualified 446 name 338 in a dependency 134 of the program 130 and a second definition 408 of the fully-qualified 446 name 338 in a source code 140 of the program 130.

Some embodiments include a database 442 wherein at least two entities 444 with the same fully-qualified 446 name 338 are collapsed 464.

In some embodiments, the analysis tool 214 includes a security analysis 438 tool 122, such as a CodeQL™ tool or similar security analysis tool which uses a database 442 of entities 444 derived from representations 210. In some embodiments, the analysis tool 214 includes a licensing analysis 440 tool 122. The security analysis tool checks, e.g., for use of libraries or other components 322 that have known security vulnerabilities. The licensing analysis tool checks, e.g., for transitive licensing requirements, e.g., when a program depends on a component X which in turn depends on a component Y which has an open source licensing requirement.

In another example, at least one processor in operable communication with the at least one digital memory is configured to perform a BDA method 700. This method 700 includes extracting 304 dependency information 306 from a file 132 of a program 130, constructing 308 a dependency set 310 from at least the dependency information, the dependency set identifying 454 a set 452 of candidate build dependencies 134 of the program. The dependency set 310 resides in and configures the at least one digital memory.

In this example, the method 700 also includes generating 212 a semantic program representation 210 which is consistent with at least one candidate build dependency of the dependency set. In some cases, this semantic program representation 210 includes an expression type representation which represents an expression type of an expression of the program or a call target representation which represents a call target of the program, or both. This method 700 also includes emitting 312 at least a portion of the program representation. In variations, one or more additional or alternative program representations 210 are emitted 312, e.g., a symbol table 460, or an abstract syntax tree 462. In some scenarios, the extracting 304, constructing 308, generating 212, and emitting 312 are performed without building 136 an executable version 448 of the program 130, e.g., without generating machine code, assembly language code, or p-code.

Some embodiments include a dependency extraction tool 216 residing in and configuring the at least one digital memory. In some, the extracting 304, constructing 308, generating 212, and emitting 312 are each performed at least in part by executing at least a portion of the dependency extraction tool. In some, the dependency extraction tool 216 is external to any compiler 124 or any interpreter 124 which has an executable code 448 generation capability 430.

However, some dependency extraction tools 216 replicate or include an adaptation of a compiler or interpreter front end. This copy or adaptation is capable, for example, of lexical analysis (including tokenization of source code), parsing, and construction of data structures which are used for code generation, e.g., semantic data structures corresponding to program representations 210. In some, the adaptation removes the capability to generate executable code.

In some embodiments, the dependency extraction tool includes: a lexical analyzer, a parser, an abstract syntax tree generator, and a symbol table populator, and the dependency extraction tool lacks any executable code generator.

Some embodiments emit 312 the program representations 210 instead of using them inside a compiler or an interpreter as a basis for executable code generation. Indeed, some embodiments are able to operate as described herein without any generation of executable code, and in particular without fully building an executable version of the program 130.

Unlike executable code generation scenarios which treat abstract syntax trees and similar semantic data structures as temporary intermediate results on the way to executable code, some program semantic representation emission scenarios taught herein persist 728 the abstract syntax trees and similar data structures to non-volatile storage 112 so they can be retrieved 730 and used to guide a subsequent security analysis 438 or licensing analysis 440. A security analysis checks for security vulnerabilities or otherwise checks compliance with security practices, guidelines, or requirements. A licensing analysis checks program component 322 licenses (or lack thereof), or otherwise checks compliance with licensing practices, guidelines, or requirements.

Different program components 322 have different security characteristics, so properly constructing the dependency set facilitates a more comprehensive and accurate security analysis than would be possible in the absence of build instructions 416 without the dependency set 310. Likewise, different program components 322 have different licensing characteristics, e.g., open source, proprietary, unrestricted, etc. In the absence of build instructions 416, the dependency set 310 permits a more comprehensive and accurate licensing analysis than would be possible without such dependency knowledge.

In some embodiments, constructing the dependency set includes using 714 an index 316 which maps a package to a list of one or more classes which are defined in the package. In some embodiments, constructing the dependency set includes using 714 an index 316 which maps a package onto an archive file.

Other system embodiments are also described herein, either directly or derivable as system versions of described processes or configured media, duly informed by the extensive discussion herein of computing hardware.

Although specific BDA architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of BDA functionality, for example, as well as different technical features, aspects, mechanisms, software, expressions, operational sequences, commands, data structures, programming environments, execution environments, environment or system characteristics, proxies, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 5, 6, and 7 each illustrate a family of methods 500, 600, and 700 respectively, which are performed or assisted by some enhanced systems, such as some systems 202 or another BDA functionality enhanced system as taught herein. Method families 500 and 600 are each a proper subset of method family 700. Moreover, activities identified in block diagrams in FIGS. 2 and 3 include method steps, which are likewise incorporated into method (a.k.a. process) 700. These diagrams and flowcharts are merely examples; as noted elsewhere, any operable combination of steps that are disclosed herein may be part of a given embodiment when called out in a claim.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types or speaks in natural language an input such as a particular value for a name of a directory (folder) or a file to receive the emitted 312 program representations 210. Such input is captured in the system 202 as digital text, or captured as digital audio which is then converted to digital text. Natural language means a language that developed naturally, such as English, French, German, Hebrew, Hindi, Japanese, Korean, Spanish, etc., as opposed to designed or constructed languages such as HTML, Python, SQL, or other programming languages. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. FIG. 7 is a supplement to the textual and figure drawing examples of embodiments provided herein and the descriptions of embodiments provided herein. In the event of any alleged inconsistency, lack of clarity, or excessive breadth due to an interpretation of FIG. 7, the content of this disclosure shall prevail over that interpretation of FIG. 7.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 7 to be non-operable, the sequence S is not within the scope of any claim. Any assertion otherwise is contrary to the present disclosure.

Some embodiments provide or utilize a method of build dependency amalgamation, the method performed in a computing system, the method including automatically: ascertaining 602 that each of at least two name resolutions 314 identifies a different respective item 330 to satisfy a build dependency 134 of a program 130; forming 604 a union 208 which specifies the at least two name resolutions; supplying 606 the union to a tool 214, 122 which is configured to conduct an analysis 504 of the program; and obtaining 610 a result 318 of the analysis, the result computed 504 from at least the union.

In some embodiments, the method includes getting 702 at least one of the name resolutions from a trace 450 of an attempt to build 136 the program 130. In some embodiments, the method includes getting 702 at least one of the name resolutions without completing a build 136 of the program.

In some embodiments, the method includes acquiring 704 a source code stub 320, 140 which represents the build dependency, and submitting 606 the source code stub to the tool 214.

In some embodiments, the method includes assigning 706 at least one name resolution a rank 456 which is computed 708 at least from the extent to which the item provides at least one of: a definition 408 of a symbol 406 which is not defined in a portion of a source code 140 of the program; a symbol data type 410 which is consistent with a use of the symbol in a portion of a source code 140 of the program; or a routine 412 signature 414 which is consistent with a use of the routine in a portion of a source code 140 of the program.

Computer program source code often includes a variety of identifiers, which are sometimes referred to as "symbols". The meanings associated with a given symbol depend on one or more of: the program's source code (sometimes referred to as the "codebase"), the programming language(s) the program source code is written in, and the program's computational environment. Generally, a given symbol represents a variable, a data type, a method, a class, an object, a field, a property, a routine, or another artifact, or an operation on one or more artifacts, in addition to representing the symbol's name as a string of characters. Examples of a routine include a function or a procedure, e.g., an object method, a void function, an exception handler, a lambda, etc.

In some embodiments, the method includes responding 722 to a compilation error 458 which is a result of an attempt to build 136 the program, and responding includes at least one of: searching 710 a version space 334; or constructing 712 an index 316 from available object 432 methods 434 and fields 436 onto version numbers 340. Some variations include compiling 124 source code and detecting the compilation error 458. The compiling in question does not necessarily generate any executable code.

In some embodiments, the method includes at least one of: utilizing 714 an index 316 from available object methods and fields onto version numbers; establishing 716 a file-to-file dependency graph 404; indexing 316 classes, object methods, and fields which are defined by different dependency files 132 to check for a clash 418; gathering 718 hints 428 from a build system as to candidate orders 422 of clashing dependencies 134, and assembling a consensus order 420, 422; or reacting 722 to a type mismatch 402 or a method mismatch 402 by determining a plurality of candidate dependency orderings 422 and assessing 708 different candidate dependency orderings 422.

Some embodiments provide or utilize a BDA dependency set construction 308 method in a computing system 102, e.g., in a computer network 108. This method includes automatically: extracting 304 dependency information from a file of a program, the extracting performed by a dependency extraction tool in a dependency extraction tool execution; from at least the dependency information, constructing 308 a dependency set which identifies a set of candidate build dependencies of the program; utilizing 502 the dependency set to generate program representations, including an expression type representation which represents an expression type of an expression of the program, and a call target representation which represents a call target of the program; and emitting 312 at least a portion of each of the program representations. In some embodiments, the extracting, constructing, utilizing, and emitting are performed without building 136 the program's executable. In some embodiments, the dependency extraction tool is external to any compiler or any interpreter which has an executable code generation capability (and hence tool 216 is not a conventional compiler or a conventional interpreter). One extractor 216 is implemented by adapting a Java compiler, using its initial analysis and typing phases, but replacing class file generation with CodeQL™ database construction.

In some scenarios, the dependency extraction tool execution is free of any completed and successful attempt to build an executable version of the program (and thus the dependency set construction is not piggy-backed on a program build), whereas in other scenarios the dependency set is extracted, at least in part, from a trace 450 created during a build attempt.

In some embodiments, the method includes adhering to a version selection priority order while constructing the dependency set. The version selection priority order specifies a version 332 recited in a repository 472 as a high priority choice, specifies an installed version 332 as a medium priority choice, and specifies a latest version 332 as a low priority choice.

In some embodiments, the method includes gathering 718 a list of program component identifications 324 from at least one of: a restored package 330, a name-value parameter persisted 728 data file 132, a restored file 132 containing a list of files 132 included in a project 426, a list of restored packages 330, or a project dependency graph 404 file 132; and including the list of program component identifications in the dependency set. In some of these embodiments, the method includes deduplicating the list of program component identifications before completing the including of the list of program component identifications in the dependency set.

In some embodiments, the method includes categorizing program component identifications 324 according to a set 452 of flavors of an open-source development platform; and limiting the dependency set to at most one flavor of the open-source development platform.

In some embodiments, the method includes generating a markup language file, and converting the markup language file to a programming language source code 140 of the program 130.

In some embodiments, constructing 308 the dependency set includes at least one of: producing 712 an index 316 which maps a package 330 to a list of one or more classes 330 which are used in the package; or producing 712 an index 316 which maps a package 330 onto an archive file 132.

In some embodiments, constructing 308 the dependency set includes sorting archive files based on at least one of these data 118: a count of classes 330 in a package 330; a similarity of package names 338; an absence or a presence of a shared package name prefix; or an absence or a presence of a package name 338 co-occurrence in an archive file 132.

In some embodiments, constructing 308 the dependency set includes querying dependency information 306 from a build system 326 file 328, 132.

In some embodiments, constructing 308 the dependency set includes adding files 132 to a working classpath of the dependency extraction tool 216. Some embodiments add them as analysis is ongoing, rather than before the tool begins execution.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is removable or not, and is volatile or not, depending on the embodiment, can be configured in the embodiment using items such as BDA software 302, dependency sets 310, program representations 210, indexes 316, extraction tools 216, files 132, and database entities 444 representing aspects of items 330, in the form of data 118 and instructions 116, read from a removable storage medium 114 and/or another source such as a network connection, to form a configured storage medium. The foregoing examples are not necessarily mutually exclusive of one another. The configured storage medium 112 is capable of causing a computer system 202 to perform technical process steps for providing or utilizing BDA functionality 204 as disclosed herein. The Figures thus help illustrate configured storage media embodiments and process (a.k.a. method) embodiments, as well as system and process embodiments. In particular, any of the method steps illustrated in FIGS. 5 to 7, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a BDA method 700 in a computing system. This method 700 includes automatically: ascertaining 602 that each of at least two name resolutions identifies a different respective item to satisfy a build dependency of a program; forming 604 a union 208 which specifies the at least two name resolutions; supplying 606 the union to a tool which is configured to conduct an analysis of the program; and conducting 504 the analysis and obtaining 610 an analysis result, the analysis result computed 504 from at least the union. In some embodiments, forming 604 a union includes placing alternative or competing name resolutions in a set which is subject to deduplication, but other embodiments allow duplicate members in a union.

In some embodiments, the method includes ranking 708 different name resolutions based on the extent to which they yield a program component which provides at least one of: a definition 408 of a symbol which is not defined in a portion of a source code of the program; a symbol data type 410 which is consistent with a use of the symbol in a portion of a source code of the program; or a routine signature 414 which is consistent with a use of the routine in a portion of a source code of the program.

In some embodiments, a candidate name resolution to a particular item version works if symbols provided by the version match (e.g., are a subset of) the program's source program. There is no match when a method or field is not defined, or is defined with a different type than in the program's source 140. Some embodiments don't penalize matching or rank when a definition makes extra definitions. In some, matching is implemented in terms of literal string name, data types, and routine signature aspects such as parameters, result type, and parameter characteristics such as pass by value or pass by reference, and whether the routine is static.

In some embodiments, conducting 504 the analysis includes at least one of: binding 724 a name which was computed according to at least the union, e.g., recited or otherwise identified in the union; or inferring 726 a data type according to at least the union.

In some embodiments, the method avoids generating executable code 448 for any of the items which are identified in the name resolutions which are specified by the union.

In some embodiments, the method includes getting 702 at least one of the name resolutions from a trace of an attempt to build the program.

Some embodiments use or provide a computer-readable storage device 112, 114 configured with data 118 and instructions 116 which upon execution by a processor 110 cause a computing system 202 to perform a BDA dependency set construction method 700 in a computing system. This method 700 includes automatically: extracting 304 dependency information from a file of a program, the extracting performed by an execution of a dependency extraction tool; from at least the dependency information, constructing 308 a dependency set which identifies a set of candidate build dependencies of the program; utilizing 502 the dependency set to generate 212 program representations; and emitting 312 at least a portion of the program representations; wherein the extracting, constructing, utilizing, and emitting are performed without building the program; and wherein the execution of the dependency extraction tool is free of any completed and successful attempt to build a full executable version of the program.

In some embodiments, the method includes limiting the dependency set to at most one flavor of a development platform.

In some embodiments, the method includes adhering to a version selection priority order while constructing the dependency set.

In some embodiments, the method includes gathering 718 a program component identification from at least a list of restored packages.

In some embodiments, the method includes gathering 718 a program component identification from at least a restored file containing a list of files included in a project.

Additional Observations Generally

Additional support for the discussion of BDA functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. It is in the context of this understanding, which pertains to all parts of the present disclosure, that examples and observations are offered herein.

Teachings provided herein are applicable in software development environments which support one or more of a variety of programming languages. As further illustration of the teachings, and not as required scope limitations, details and examples are now provided for various scenarios which involve dependency fetching and resolution.

A tracing extraction involves intercepting calls to a compiler 124. Each compiler invocation results in a call to an extraction engine. A different approach doesn't rely on access to the exact compiler calls that would build a project. Instead, an embodiment runs the extraction as if there was one single compiler invocation with all the source files in the repository.

Source files are one type of input to the compiler. But for a compilation to be successful, a build operation considers other inputs too, such as references, defined symbols, and compiler flags. In a tracing extraction, these arguments are automatically available for an extractor engine via inspection of compiler invocations during a build.

In a different approach, the build tool (e.g., MsBuild) is replaced by preprocessing logic that performs dependency fetching and resolution, and generates some source files in some cases. Then all these pieces of data are added to the originally provided source files to perform a compilation with as few compiler errors as possible.

To figure out the additional compiler inputs, some embodiments inspect source files in the repository that would otherwise drive the MsBuild build process. There are different versions and flavors of the MsBuild input files, so some embodiments cover multiple cases. "Flavor" refers to one or more of: build configuration, codebase selection, target kernel, target processor architecture, version number range, or a particular functionality which is present or absent.

Some embodiments use one or more tools to fetch dependencies, e.g., a dotnet SDK tool. An embodiment is not using the SDK directly as a dependency of the application that it's extracting, rather, a goal is to use the same tools as the user would use, in order to implement user intentions more closely. Some embodiments check which version of the SDK to employ. If it is specified, the embodiment downloads the exact required version, and it is used. Alternatively, the embodiment employs the installed version. If there's no installed version, the embodiment downloads the latest version.

With regard to traced extraction and program analysis 504, some tools 214 employ not merely the text 140 of the program, but several derived pieces of information indicating what functions are potentially the targets of calls, and the types of program expressions. Expression types and call targets depend not just on the user's program, but on its external dependencies-therefore security analysis as taught herein sometimes attempts to discover the external dependencies. Some approaches taught herein try to guess appropriate dependencies for the user's code, and invoke an extractor directly, passing it all source code in the user's repository (perhaps restricted by user-specified path constraints), and guess dependencies based on a mix of information found in the source code and in build scripts.

In some buildless extraction scenarios, an analysis tool is presented with a repository containing one or more .java files and no Maven, Gradle or other Java build scripts 416 are available or at least have not been located. In this situation, one extraction approach uses an inverted index of Maven Central, which maps Java package names onto Maven artefacts that define classes in that package, combined with dynamic classpath discovery.

In some scenarios, an embodiment encounters some name resolution failures due to using the wrong version of a dependency, or the wrong dependency entirely. Therefore when build system files 416 (e.g., Maven's pom.xml files or Gradle's build.gradle [.kts] and related files) are present, some embodiments use them to extract information about the actual dependencies used, as well as the version of Java and therefore the Java standard library expected by user code. Some embodiments query dependency information from a build system. Some dependencies are indirect and are not literally present in the build system file, but rather are produced by the build system walking the tree of dependencies.

In some scenarios, an embodiment queries Maven or Gradle or both for any dependency information, e.g., using a depgraph-maven-plugin from a user ferstl available on github.com or a github-dependency-graph-gradle-plugin available on github.com, respectively. These plugins expose a graph 404 of both direct and indirect dependencies to build the user's code, and are likely to be stronger candidates than using an inverted index alone. Artefacts provided by the dependency graph 404 are placed on the classpath closest-first and matching the underlying build system's ordering as closely as possible (with a caveat that if multiple subprojects use contradictory orders, an ordering is chosen). The inverted index is still consulted if some user code dependencies remain unsatisfied, which may occur for example when some user code present in the repository is not built by Maven or Gradle, or when the dependency graph plugins were unable to retrieve a relevant dependency.

More generally, some embodiments extract information from source files (e.g., imported package names) and build system files (dependency versions and sources) in order to determine how a project is likely to fit together (e.g., which source names refer to which source or external dependency names, and therefore the types of expressions). This is accomplished without relying on the build system being able to successfully complete in the working environment.

Some embodiments include an adaptation of a compiler 124. A non-adapted compiler is normally explicitly told the dependencies that provide external names and symbols. One adaptation instead uses an index that maps package names onto jar files that sometimes provide relevant classes in that package, and tries adding the suggested files to its working classpath as it goes in order to auto-detect its external dependencies.

Some embodiments piggy-back the production of call target and expression type representations 210 on top of a build performed according to a build instructions file 416, 132, instead of using the embodiments to fetch and otherwise construct the dependencies for such production in a buildless manner. But in some scenarios, relying on the presence and availability of build instructions 416 as part of a security analysis or a licensing analysis is disadvantageous. Such reliance inhibits scaling the analysis. Performing the dependency fetching and subsequent analysis without explicit pre-existing build instructions 416 imposes a smaller integration burden, reduces risk of mistakes, and supports scaling analysis of source code where no build instruction is readily available.

In particular, a security team is not a development team, so the security team often does not know how to perform a build according to policy guidelines, lacks the particular program's build instructions, is unfamiliar with the build tool chain, etc. However, with embodiments taught herein, the security team is still able to perform substantial security analyses. Indeed, determining dependencies as taught herein permits a more in-depth security analysis than a purely syntactic AST-based analysis.

Some embodiments extract some dependency information 428 from a source file 140, use the extracted information to construct a set of dependencies, utilize the dependencies 134 to generate semantic representations (e.g., abstract syntax trees, symbol tables), and then emit the representations 210 (e.g., to a CodeQL™ database 442 to facilitate security analysis). This is done in some embodiments with a dependency extraction tool 216 that is not a code-generating compiler, and it is done in some scenarios without a full successful build 136 (i.e., with only a partial build, or a failed build, or no build).

Some embodiments utilize or provide dependency 134 determination functionality 204, e.g., one or more of:

(1) Fetching dependences 134 without deduplication, and merging 604 multiple definitions of a given fully-qualified name 338 to implement a union 208 semantics. This differs from resolving ambiguities down to a single name, as is done in a build 136. Note that the union semantics taught herein work both with traced extraction and with buildless construction of a dependency set, and also work both with security analysis and with licensing analysis, in at least some embodiments. In a traced extraction context, some embodiments of union semantics presume or rely on overlapping dependencies being included in separate compilations.

(2) Automating selection of a version 332 of a dependency when build system information 416 is unavailable, e.g., by responding 722 to compile errors 458 that suggest an issue with a given dependency by interval-bisecting version space (the space of identified versions) or otherwise searching 710 version space 334, or by constructing 712 indices 316 from the available object methods and fields onto version numbers 340, fetching the relevant index and using 714 it to inform version selection. In some embodiments, an index 316 includes a terse description of what distinguishes one version from another, such as any difference between symbols in version N and version N-1. In some cases, a version search algorithm returns more than one closest version, e.g., when a range of dependent versions match equally well with respect to the symbols implicated in a dependency.

(3) Automating division of a repository into subsets that have acyclic dependencies, determining the names 338 defined and used by each file 132, and establishing a file-to-file dependency graph 404 and finding any cycles in it.

(4) Establishing 720 an order 422 of required dependencies, by indexing 712 the classes, object methods and fields defined by different dependency files to establish which ones clash 418 and therefore shadow one another, amalgamating potentially-contradictory hints 428 from a build system as to the best orders for clashing dependencies, assembling a consensus order 420, and responding 722 to type and object method mismatches 402 by determining and adjusting dependency orderings.

In some embodiments, the union semantics handles cases where the same fully-qualified name appears multiple times in a source code repository, either as source code, as dependencies, or possibly both. Consider the following two example scenarios.

Union Example Scenario 1: A repository includes two sub-projects P1 and P2, where P1 depends on version X of dependency D, while P2 depends on version Y of the same dependency D, X!=Y. In a variation, the repository consists of P1 and P2. Regardless, both versions of D define an item 330 with a fully-qualified name FQN; version X uniquely defines item FQNX and version Y uniquely defines item FQNY. P1 relies on the existence of FQN and FQNX, while P2 relies on the existence of FQN and FQNY. Consequently, P1 is incompatible 418 with version Y and P2 is incompatible 418 with version X, respectively.

Union Example Scenario 2: A repository includes (or consists of) two sub-projects P1 and P2, where both P1 and P2 define an item 330 in source code with a fully-qualified name FQN. In compilation as part of a build 136, fully-qualified names must be resolved to a single unique item, so a successful build of both example's repositories would require isolated compilations with each item version. More generally, successful builds covering all possibilities in the version space would include each combination of possible name resolutions for each build dependency which is not resolved to a single item. In a traced extraction, a system 202 could intercept each compilation separately, and then construct a CodeQL™ database, where entities with the same fully-qualified name are collapsed together.

In a buildless extraction approach under Example Scenario 1, selecting either version X or Y of dependency D would lose information, as the extraction would not reflect the existence of the other version (FQNY or FQNX). Instead, some embodiments taught herein consider the union 208 of versions X and Y, e.g., by collapsing 464 items with the same fully-qualified name into a union entity 444. An embodiment performs a subset of parsing, AST construction, name binding 724, type inference 726, and other operations 212 that a compiler would do in a build, but in an adapted manner that is based on the union. This permits creation, e.g., of a CodeQL™ database 442 similar to traced extraction database results, but without requiring a successful build. A similar approach is taken in Example scenario 2: the embodiment collapses 464 source code items with the same fully-qualified name into a single entity, performs a subset of compilation analyses to generate 212 representations 210, and emits representations 210, either for a CodeQL™ database or for direct use in an analysis 504.

In some circumstances, some embodiments treat dependencies and source code completely the same, by turning 704 all dependencies into source code stubs 320, and then feeding 606 non-union item source code and generated stubs into the analysis. This approach also has the benefit of accounting for cases where the same fully-qualified name is defined both in a dependency and in source code.

The union semantics for dependency fetching improves coverage of the security analysis, licensing analysis, or other analysis 504, by considering multiple guesses for a build dependency. In an actual build, only one of these dependencies would be used, but in an analysis 504 context lacking build instructions it is often unclear which dependency guess would actually be used, so multiple dependency name resolutions are analyzed via the union 208.

Internet of Things

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as lexical analysis, parsing, AST creation, symbol table creation, representation emittance, security analysis, licensing analysis, dependency set construction, and classpath modification, which are each an activity deeply rooted in computing technology. Some of the technical mechanisms discussed include, e.g., extraction tools 216, representation generators 212, security tools 214, BDA software 302, executable code generators 430, source code generators, abstract syntax trees 462, symbol tables 460, and databases 442. Some of the technical effects discussed include, e.g., construction 308 of dependency sets 310 without explicit program build instructions 416, generation 212 of program semantic representations 210 which are suitable for a security analysis despite the absence of a full build and without the emittance of executable code 448, reduction of computational resource usage for program representation generation 212, and improved scalability and flexibility for security analysis 438 and for licensing analysis 440. Thus, purely mental processes and activities limited to pen-and-paper are clearly excluded from the scope of any embodiment. Other advantages based on the technical characteristics of the teachings will also be apparent to one of skill from the description provided.

One of skill understands that dependency fetching in a computing network 108 or other computing system 102 is technical activity which cannot be performed mentally at all, and cannot be performed manually with the speed and accuracy required in computing systems. Hence, dependency fetching technology improvements such as the various examples of BDA functionality 204 described herein are improvements to computing technology. One of skill understands that attempting to manually determine dependencies in the absence of build instructions would create unacceptable delays in analysis 504, pose severe risks of damage from undetected security vulnerabilities, and introduce unnecessary and unacceptable human errors. People manifestly lack the speed, accuracy, memory capacity, and specific processing capabilities required to perform dependency set construction as taught herein.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as a CodeQL™ tool or another security analysis tool, such as a static application security testing (SAST) tool, or a static analysis tool, or an anti-virus tool, for example. Other practical applications include a licensing requirements analysis tool, such as a tool that groups program components according to whether they include open source components, or include other components which are subject to licensing requirements that are transitive, e.g., requirements whereby component X being dependent on component Y and component Y being subject to a licensing mechanism means that component X is also subject to that licensing mechanism.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to determine likely correct program build dependencies in the absence of build instructions, how to generate program representations 210 without invoking or otherwise piggy-backing on a build process, and how to leverage an incomplete set of build instructions for fetching build dependencies. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

ADDITIONAL COMBINATIONS AND VARIATIONS

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, language models, prompts, motivating examples, operating environments, tools, peripherals, software process flows, identifiers, repositories, data structures, data selections, naming conventions, notations, control flows, or other implementation choices described herein. Any apparent conflict with any other patent disclosure, even from the owner of the present subject matter, has no role in interpreting the claims presented in this patent disclosure.

ACRONYMS, ABBREVIATIONS, NAMES, AND SYMBOLS

Some acronyms, abbreviations, names, and symbols are defined below. Others are defined elsewhere herein, or do not require definition here in order to be understood by one of skill.

ALU: arithmetic and logic unit
API: application program interface
AST: abstract syntax tree
BIOS: basic input/output system
CD: compact disc
CLI: command line interface, command line interpreter
CPU: central processing unit
DLL: dynamic link library
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
IDE: integrated development environment
JSON: JavaScript® Object Notation (mark of Oracle America, Inc.).
LAN: local area network
OS: operating system
PaaS or PAAS: platform-as-a-service
RAM: random access memory
ROM: read only memory
SAST: static application security testing
SDK: software development kit
SIEM: security information and event management
TPU: tensor processing unit
UEFI: Unified Extensible Firmware Interface
UI: user interface
WAN: wide area network

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin (x)) or it may simply return without also providing a value (e.g., void functions).

"Service" as a noun means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account or user session, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or a user session or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "method"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. BDA operations such as parsing, AST generating, component identification gathering 718, union forming 604, and many other operations discussed herein (whether recited in the Figures or not), are understood to be inherently digital and computational. A human mind cannot interface directly with a CPU or other processor, or with RAM or other digital storage, to read and write the necessary data to perform the BDA steps 700 taught herein even in a hypothetical situation or a prototype situation, much less in an embodiment's real world large computing environment, e.g., an internet-connected environment. This would all be well understood by persons of skill in the art in view of the present disclosure. Moreover, one of skill understands that BDA functionality cannot be implemented using merely conventional tools and steps, because actual implementation requires the use of teachings which were first provided in the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as adding, adhering, analyzing, building, categorizing, compiling, constructing, converting, deduplicating, emitting, employing, executing, extracting, gathering, generating, identifying, including, limiting, parsing, persisting, producing, querying, restoring, sorting, using, utilizing (and adds, added, adheres, adhered, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Note Regarding Hyperlinks

Portions of this disclosure contain URIs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have these URIs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

REMARKS REGARDING REFERENCE NUMERALS

Reference numerals are provided for convenience and in support of the drawing figures and as part of the text of the specification, which collectively describe aspects of embodiments by reference to multiple items. Items which do not have a unique reference numeral may nonetheless be part of a given embodiment. For better legibility of the text, a given reference numeral is recited near some, but not all, recitations of the referenced item in the text. The same reference numeral may be used with reference to different examples or different instances of a given item.

The following remarks pertain to particular reference numerals:

100 operating environment, also referred to as computing environment; includes one or more systems 102

101 machine in a system 102, e.g., any device having at least a processor 110 and having a distinct identifier such as an IP address or a MAC (media access control) address; may be a physical machine or be a virtual machine implemented on physical hardware

102 computer system, also referred to as a "computational system" or "computing system", and when in a network may be referred to as a "node" 104 users, e.g., user of an enhanced system 202

106 peripheral device

108 network generally, including, e.g., LANs, WANs, software-defined networks, clouds, and other wired or wireless networks

110 processor or non-empty set of processors; includes hardware

112 computer-readable storage medium, e.g., RAM, hard disks; also referred to as storage device

114 removable configured computer-readable storage medium

116 instructions executable with processor; may be on removable storage media or in other memory (volatile or nonvolatile or both)

118 digital data in a system 102; data structures, values, source code, and other examples are discussed herein

120 kernel(s), e.g., operating system(s), BIOS, UEFI, device drivers; also refers to an execution engine such as a language runtime

122 software tools, software applications, security controls; hardware tools; computational

124 compiler or interpreter which generates executable code, e.g., machine code, assembly code, p-code, or the like

126 display screens, also referred to as "displays"

128 computing hardware not otherwise associated with a reference numeral 106, 108, 110, 112, 114

138 cloud, also referred to as cloud environment or cloud computing environment

202 enhanced computing system, i.e., system 102 enhanced with functionality 204 as taught herein

204 build dependency amalgamation functionality (also referred to as BDA functionality 204, dependency determination functionality 204, or functionality 204), e.g., software or specialized hardware which performs or is configured to perform steps 304 and 308, or steps 308 and 504, or steps 304 and 212, or any software or hardware which performs or is configured to perform a dependency set construction activity first disclosed herein, or to perform a novel method 700 first disclosed herein

500 flowchart; 500 also refers to dependency set construction methods that are illustrated by or consistent with the FIG. 5 flowchart or any variation of the FIG. 5 flowchart described herein; all dependency set construction method steps are computational, not human activity

600 flowchart; 600 also refers to dependency set construction methods that are illustrated by or consistent with the FIG. 6 flowchart or any variation of the FIG. 6 flowchart described herein; all dependency set construction method steps are computational, not human activity

700 flowchart; 700 also refers to dependency set construction methods that are illustrated by or consistent with the FIG. 7 flowchart, which incorporates the FIG. 6 flowchart, the FIG. 5 flowchart, the FIG. 3 steps, the FIG. 2 steps, and all other steps taught herein, or methods that are illustrated by or consistent with any variation of the FIG. 7 flowchart described herein; all dependency set construction method steps are computational, not human activity

732 any step or item discussed in the present disclosure that has not been assigned some other reference numeral; 732 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments construct 308 a set of build dependencies 134 for a program 130 without access to a full set of build instructions 416. When multiple clashing name resolutions 314 are identified for a particular dependency, a union 208 of the alternative versions 332 is formed 604. Intermediate representations 210 of the union of program versions, such as symbol tables 460, abstract syntax trees 462, and other internal compiler data structures, are emitted 312 to persistent non-volatile storage, instead of using a single resolution to create temporary intermediate data to build an executable program 448. Security analysis 438, 504 and licensing analysis 440, 504 utilize the persisted program representations to analyze the union of multiple overlapping but different versions of components 322 of the program. Forming 604 a union 208 that represents the multiple name resolutions 314 of a particular dependency 134 allows analysis tools 214 to consider all those name resolutions at one time, which is more efficient than repeating most of an analysis 504 multiple times with each name resolution in turn.

In one example scenario, a security analysis computes a data flow through a program using static analysis and checks along that flow for incorrect or unsafe uses of a variable. A first data flow corresponds to the use of a first name resolution for a dependency, and a second data flow corresponds to the use of a second name resolution for the dependency. The first data flow and the second data flow coincide for part but not all of their respective paths. An inefficient approach computes the entire first data flow, checks along its length for incorrect or unsafe uses of the variable, and then computes the entire second data flow and checks along its length for incorrect or unsafe uses of the variable. Thus, data flow path computation and checks along the shared portion of the two flows are repeated. Embodiments herein support a more efficient approach, wherein the two name resolutions are placed in a union, and the re-computation and re-traversal of the shared portion of the data flow paths are unnecessary. More generally, because the competing resolutions of the dependency are collected into the union, the analysis tool is able to re-use computations and computational results that pertain to any two or more of the members of the union.

Embodiments are understood to also themselves include or benefit from tested and appropriate security controls and privacy controls such as the General Data Protection Regulation (GDPR). Use of the tools and techniques taught herein can be used together with such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method of build dependency amalgamation, the method performed by a computing system, the method comprising:

ascertaining that each of at least two name resolutions identifies a different respective item to satisfy a build dependency of a program;

forming, by the computing system, a union which specifies the at least two name resolutions;

supplying the union to a tool which is configured to conduct an analysis of the program; and obtaining a result of the analysis while avoiding building a full program executable, the result computed from at least the union.

2. The method of claim 1, further comprising at least one of:

getting at least one of the name resolutions from a trace of an attempt to build the program; or getting at least one of the name resolutions without completing a build of the program.

3. The method of claim 1, further comprising acquiring a source code stub which represents the build dependency, and submitting the source code stub to the tool.

4. The method of claim 1, wherein the method further comprises assigning, to at least one name resolution, a rank which is computed based at least on an extent to which the respective item provides at least one of:

a definition of a symbol which is not defined in a portion of a source code of the program;

a symbol data type which is consistent with a use of the symbol in a portion of a source code of the program; or a routine signature which is consistent with a use of the routine in a portion of a source code of the program.

5. The method of claim 1, wherein the method further comprises responding to a compilation error which is a result of an attempt to build the program, and wherein responding comprises at least one of:

searching a version space; or constructing an index from available object methods and fields onto version numbers.

6. The method of claim 1, wherein the method further comprises at least one of:

utilizing an index from available object methods and fields onto version numbers;

establishing a file-to-file dependency graph;

indexing classes, object methods, and fields which are defined by different dependency files to check for a clash;

gathering hints from a build system as to candidate orders of clashing dependencies, and assembling a consensus order; or reacting to a type mismatch or a method mismatch by determining a plurality of candidate dependency orderings and assessing different candidate dependency orderings.

7. A computing system, comprising:

at least one digital memory;

at least one processor in operable communication with the at least one digital memory, the at least one processor configured to perform a build dependency amalgamation method which comprises (a) ascertaining that each of at least two name resolutions in a non-empty set of name resolutions identifies a different respective item to satisfy a build dependency of a program, (b) forming a union which specifies the at least two name resolutions, (c) supplying the union to a tool which is configured to conduct an analysis of the program, and (d) receiving a result of the analysis while avoiding building a full program executable, the result computed from at least the union.

8. The computing system of claim 7, wherein the set of name resolutions comprises at respective identifications of two different versions of a program component that each satisfy the build dependency.

9. The computing system of claim 7, wherein the set of name resolutions comprises respective identifications of two different versions of a source code which is specified in the build dependency.

10. The computing system of claim 7, wherein the set of name resolutions comprises identifications of two different fully-qualified names which identify respective alternatives for a program component of the program.

11. The computing system of claim 7, wherein the set of name resolutions comprises identifications of two items which reside in different respective sub-projects.

12. The computing system of claim 7, wherein the set of name resolutions comprises a first definition of a fully-qualified name in a dependency of the program and a second definition of the fully-qualified name in a source code of the program.

13. The computing system of claim 7, further comprising a database wherein at least two entities with the same fully-qualified name are collapsed.

14. The computing system of claim 7, wherein the tool comprises a security analysis tool.

15. The computing system of claim 7, wherein the tool comprises a licensing analysis tool.

16. A computer-readable storage medium configured storing instructions which upon execution by a processor cause a computing system to perform a build dependency amalgamation method, the method comprising:

ascertaining that each of at least two name resolutions identifies a different respective item to satisfy a build dependency of a program;

forming a union which specifies the at least two name resolutions;

supplying the union to a tool which is configured to conduct an analysis of the program; and conducting the analysis and obtaining an analysis result while avoiding building a full program executable, the analysis result computed from at least the union.

17. The computer-readable storage medium of claim 16, wherein the method further comprises ranking different name resolutions based on the extent to which they yield a program component which provides at least one of:

a definition of a symbol which is not defined in a portion of a source code of the program;

a symbol data type which is consistent with a use of the symbol in a portion of a source code of the program; or a routine signature which is consistent with a use of the routine in a portion of a source code of the program.

18. The computer-readable storage medium of claim 16, wherein conducting the analysis comprises at least one of:

binding a name computed according to at least the union; or inferring a data type according to at least the union.

19. The computer-readable storage medium of claim 16, wherein the method avoids generating executable code for any of the items which are identified in the name resolutions which are specified by the union.

20. The computer-readable storage medium of claim 16, wherein the method comprises getting at least one of the name resolutions from a trace of an attempt to build the program.

* * * * *